June 3, 1924.
O. VOSBURGH
1,496,039
CLUTCH PEDAL LOCK FOR TRACTORS
Filed Aug. 31, 1923
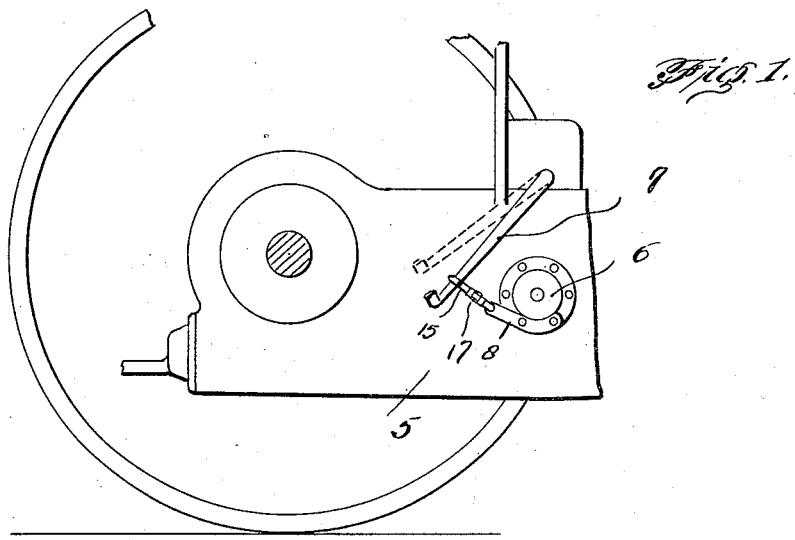
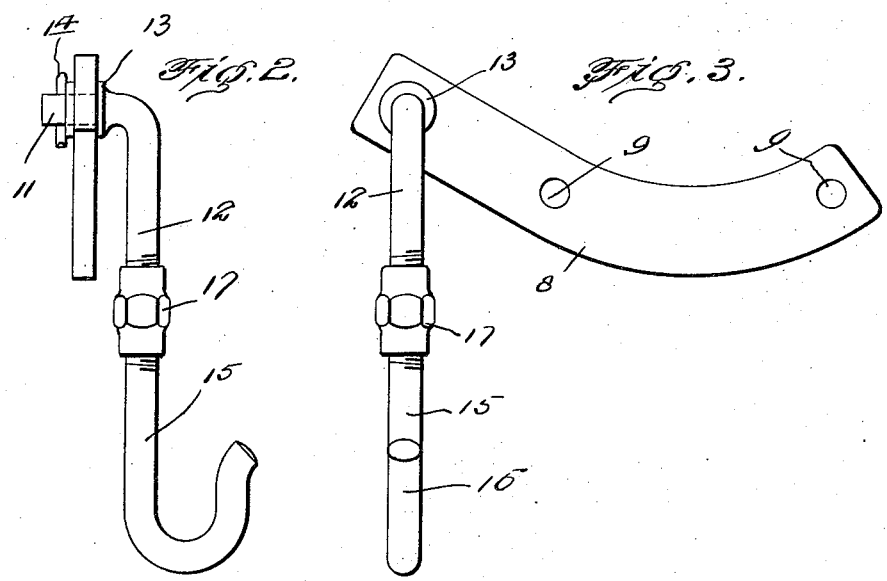
Witness.
F. C. Gibson.
Inventor
Orvil Vosburgh.
By
Attorney Patented June 3, 1924.

1,496,039

UNITED STATES PATENT OFFICE.

ORVIL VOSBURGH, OF ROCKWELL, IOWA.

CLUTCH-PEDAL LOCK FOR TRACTORS.

Application filed August 31, 1923. Serial No. 660,266.

*To all whom it may concern:*

Be it known that I, ORVIL VOSBURGH, a citizen of the United States, residing at Rockwell, in the county of Cerro Gordo and State of Iowa, have invented certain new and useful Improvements in Clutch-Pedal Locks for Tractors, of which the following is a specification.

In carrying out the present invention it is my purpose to provide a means whereby the clutch pedal of tractors and particularly those of the Ford type may be maintained in a depressed position without requiring the presence of an operator for holding the same in such position.

The primary object of my invention resides in the provision of such a lock that may be attached to the tractor in a novel, simple and expeditious manner and one that may be manufactured and marketed at a relatively small cost.

An additional object of the invention resides in the provision of such a device wherein the locking element per se may be adjusted to different lengths for accommodating the variances in the clutches of different tractors.

With the above and other objects in view as the nature of the invention is better understood, the same comprises the novel form, combination and arrangement of parts shown in the accompanying drawing, set forth in the following detailed specification and claimed.

In the drawing wherein like reference characters indicate corresponding parts throughout the several views, Figure 1 is a fragmentary detail cross section through a certain portion of a Ford type tractor showing my improved clutch pedal lock associated therewith the clutch pedal thereof being shown in locked position and in dotted line unlocked position, Figure 2 is an end elevational view of my clutch pedal lock per se, and Figure 3 is a similar view of one side of my improved lock.

Now having particular reference to the drawing, 5 indicates the transmission housing of the tractor, 6 the usual foot rest and 7 the clutch pedal.

My invention per se embodies the provision of a plate 8 that is slightly arcuate-shaped at its front end and provided with a pair of openings 9 whereby this plate may be bolted to the said foot rest 6 through the medium of the bolt that maintains said foot rest in proper position upon said transmission housing 5.

The rearmost end of this plate 8 is provided with an opening through which extends the reduced and inwardly bent end 10 of a downwardly extending bar section 12 which is formed with a shoulder 13 for contact with the outer face of said plate 8 as more clearly shown in Figure 2. The projecting end of the reduced and inwardly extending portion 11 of said bar element is provided with a transverse opening for the reception of a cotter or other desirable pin 14 whereby the same is maintained in pivotal engagement with the plate 8.

An additional bar 15 is also provided which is upturned at its lower end to provide a hook 16 these bars adapted to be adjustably secured together through the medium of a turn buckle 17 it being understood that the adjacent ends of these bars are to be screw-threaded in opposite directions for accommodating said turn buckle 17.

In actual practice, the clutch pedal 7 is forced downwardly to the full line position of Figure 1 and the hook-shaped end 16 of the bar section 15 engaged thereover after which the same will be maintained in such depressed condition.

Whenever it is desired to release this clutch pedal a still further downward pressure may be placed thereon at which time the locking element per se will swing downwardly to the position in Figure 3, thereby allowing this clutch pedal to move upwardly to the dotted line position when foot pressure is removed therefrom.

Numerous advantages of a clutch pedal lock for tractors of this character will be at once apparent to those skilled in the art, and even though I have herein set forth the most practical embodiment of the invention with which I am at the present time familiar, it is nevertheless to be understood that minor changes may be made therein without departing from the spirit and scope of the appended claim.

Having thus described my invention what I claim as new and desire to secure by Letters Patent is:—

In a tractor, the combination of a body having a foot rest, a pedal pivoted upon the body for movement transversely of the foot rest, pedal locking means comprising a longitudinally curved plate mounted upon the foot rest, said plate being disposed parallel with the path of movement of the pedal, a hook having an angular disposed end portion which passes through the plate, and which is pivoted therein, said hook having a bill end which is disposed transversely across the path of movement of the pedal, and means carried by the angularly disposed end portion of the hook and engaging the plate, to limit the swinging movement of the hook, to a path which is parallel with the plate, and the intermediate portion of the pedal.

In testimony whereof I affix my signature.

ORVIL VOSBURGH.